Dec. 1, 1931.  C. B. MARK  1,834,249
AXLE ATTACHMENT
Filed June 12, 1931
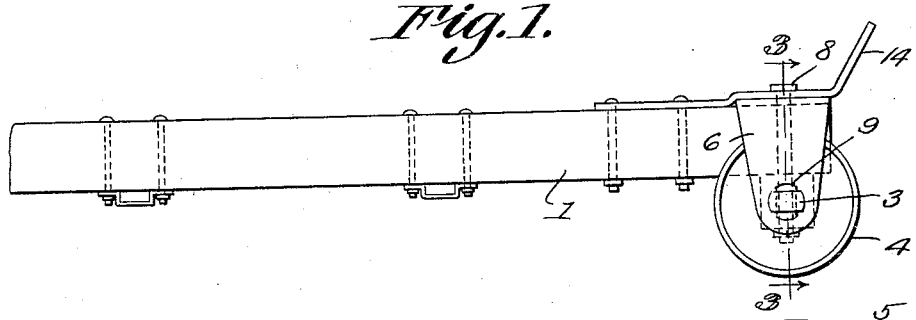
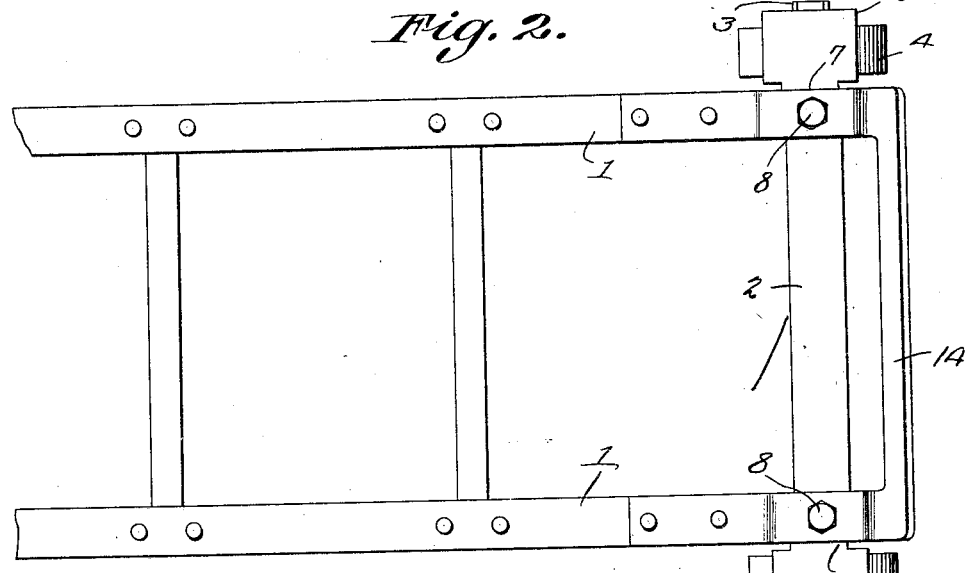
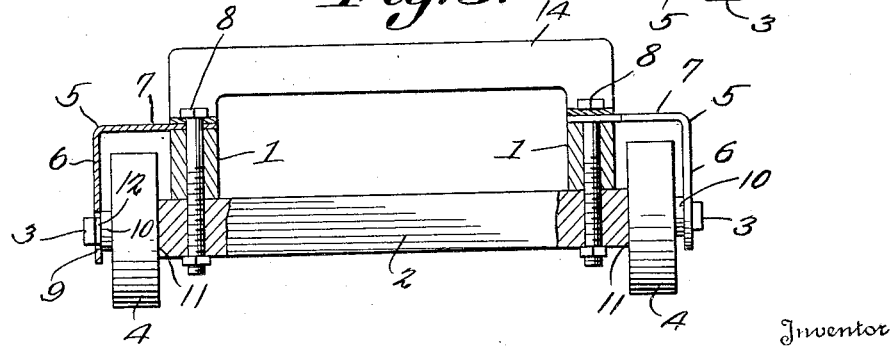
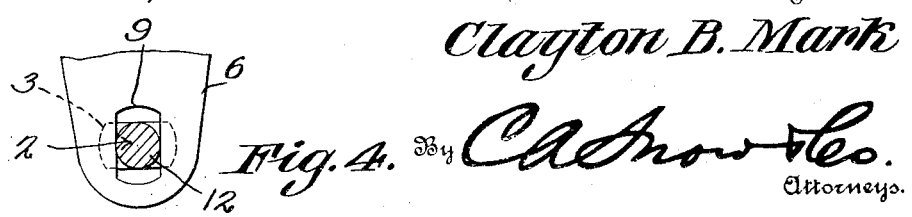
Inventor
Clayton B. Mark
By C. A. Snow & Co.
Attorneys Patented Dec. 1, 1931

1,834,249

UNITED STATES PATENT OFFICE

CLAYTON B. MARK, OF LEBANON, PENNSYLVANIA

AXLE ATTACHMENT

Application filed June 12, 1931. Serial No. 544,002.

This invention aims to provide a novel means for holding the wheels on a hand truck, without resorting to hub caps, rims, or other fastening devices, likely to become detached, and release the wheels from the axle. Another object of the invention is to provide a wheel fastener which will also serve as a wheel guard. A further object of the invention is to provide novel means whereby the axle, the truck frame, and the combined wheel fastener and wheel guard may be held together by a single bolt or the like.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows, in side elevation, a truck equipped with the device forming the subject matter of this application, parts being broken away; Figure 2 is a top plan; Figure 3 is a transverse section, on the line 3—3 of Figure 1; Figure 4 is a transverse section taken through the axle.

The numeral 1 marks a truck frame. An axle 2 is disposed below the truck frame 1, and has a transverse head 3 at each end. Wheels 4 are journaled on the axle 2, between the heads 3 and the truck frame 1.

The numeral 5 designates an angle bracket. One arm 6 of the angle bracket 5 is mounted on the axle end, inwardly of the head 3 and outwardly of the wheel 4. The other arm 7 of the angle bracket 5 extends over the upper edge of the truck frame 1, and above the wheel 4 to serve as a wheel guard. A securing element 8, such as a bolt, connects the arm 7 of the angle bracket 5, and the axle 2, with the truck frame 1. The arm 6 of the angle bracket 5 has an opening 9 approximating the cross section of the head 3, and through which the head can pass, before the arm 7 of the angle bracket is disposed over the upper edge of the truck frame 1 and above the wheel 4, the opening being disposed out of registration with the head, when the arm 7 of the angle bracket 5 is disposed over the upper edge of the truck frame and above the wheel.

The head 3 holds the arm 6 on the end of the axle, and the arm 6 keeps the wheel 4 in place, without using hub caps, cross pins, or anything else likely to become detached and permit the wheel 4 to work off the axle. The arm 7 keeps the material on the truck from dragging on the wheel 4. The angle bracket 5 is a combined wheel fastener and wheel guard.

The axle 2 may be reduced to form a shaft 10 on which the wheel 4 is journaled immediately, and the shaft 10 forms a shoulder 11 which keeps the wheel 4 from rubbing on the side of the truck frame 1. The shaft 10 is reduced to form a spindle 12, which carries the head 3, the spindle being located in the opening 9, as Figure 4 will show. The foot 14 of the truck may overlap the arms 7 of the angle brackets 5, and be held in place by the bolts 8.

What is claimed is:—

1. The combination with a truck frame, of an axle disposed below the truck frame and having a transverse head at its end, a wheel journaled on the axle, between the head and the truck frame, an angle bracket one arm of which is mounted on the axle end, inwardly of the head and outwardly of the wheel, the other arm of the angle bracket extending over the upper edge of the truck frame, and above the wheel to serve as a wheel guard, and a securing element connecting the last-specified arm of the angle bracket, and the axle, with the truck frame, the first-specified arm of the angle bracket having an opening approximating the cross section of the head, and through which the head can pass, before the last-specified arm of the angle bracket is disposed over the upper edge of the truck frame and above the wheel, the opening being disposed out of registration with the head, when the last-specified arm of the angle bracket is disposed over the upper edge of the truck frame and above the wheel.

2. The device of claim 1, in combination with a merchandise-holding foot for the truck, overlapped on the last-specified arm of the angle bracket and engaged by the securing element.

In testimony that I claim the foregoing as my own, I have hereto affixed my signature.

CLAYTON B. MARK.